United States Patent
Ren et al.

(10) Patent No.: US 11,657,592 B2
(45) Date of Patent: May 23, 2023

(54) SYSTEMS AND METHODS FOR OBJECT RECOGNITION

(71) Applicant: ZHEJIANG DAHUA TECHNOLOGY CO., LTD., Zhejiang (CN)

(72) Inventors: Xinyi Ren, Hangzhou (CN); Feng Wang, Hangzhou (CN); Haitao Sun, Hangzhou (CN); Jianping Xiong, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 6 days.

(21) Appl. No.: 17/304,742

(22) Filed: Jun. 24, 2021

(65) Prior Publication Data
US 2021/0357656 A1    Nov. 18, 2021

Related U.S. Application Data

(63) Continuation of application No. PCT/CN2018/123775, filed on Dec. 26, 2018.

(51) Int. Cl.
| | |
|---|---|
| *G06V 10/44* | (2022.01) |
| *H04N 7/18* | (2006.01) |
| *G06V 20/52* | (2022.01) |
| *G06V 30/413* | (2022.01) |
| *G06V 10/75* | (2022.01) |
| *G06V 10/52* | (2022.01) |

(52) U.S. Cl.
CPC ............. *G06V 10/44* (2022.01); *G06V 10/52* (2022.01); *G06V 10/759* (2022.01); *G06V 20/52* (2022.01); *G06V 30/413* (2022.01); *H04N 7/183* (2013.01)

(58) Field of Classification Search
CPC ...... G06V 20/52; G06V 30/413; G06V 10/44; G06V 10/759; G06V 10/52; H04N 7/183
USPC .......................................................... 348/143
See application file for complete search history.

(56) References Cited

U.S. PATENT DOCUMENTS

| | | |
|---|---|---|
| 2002/0057838 A1 | 5/2002 | Steger |
| 2008/0166053 A1 | 7/2008 | Furuhashi et al. |
| | (Continued) | |

FOREIGN PATENT DOCUMENTS

| | | |
|---|---|---|
| CN | 102663708 A | 9/2012 |
| CN | 105930858 A | 9/2016 |
| CN | 107452028 A | 12/2017 |

OTHER PUBLICATIONS

International Search Report in PCT/CN2018/123775 dated Sep. 26, 2019, 5 pages.

(Continued)

*Primary Examiner* — Allen C Wong
(74) *Attorney, Agent, or Firm* — Metis IP LLC

(57) ABSTRACT

The present disclosure relates to systems and methods for object recognition. The system may obtain an image and a model. The image may include a search region in which the object recognition process is performed. In the objection recognition process, for each of one or more sub-regions of the search region, the system may determine a match metric indicating a similarity between the model and the sub-region of the search region. Further, the system may determine an instance of the model among the one or more sub-regions of the search region based on the match metrics.

18 Claims, 8 Drawing Sheets

(56) References Cited

U.S. PATENT DOCUMENTS

| | | | |
|---|---|---|---|
| 2008/0205764 A1 | 8/2008 | Iwai et al. | |
| 2009/0316990 A1 | 12/2009 | Nakamura et al. | |
| 2013/0089235 A1* | 4/2013 | Yoon ..................... | G06V 20/10 |
| | | | 382/153 |
| 2014/0267243 A1* | 9/2014 | Venkataraman ........ | G06T 7/557 |
| | | | 345/419 |
| 2016/0012595 A1* | 1/2016 | Romanik ................ | G06F 18/00 |
| | | | 382/203 |
| 2017/0177970 A1* | 6/2017 | Kitajima ................ | G06V 10/44 |

OTHER PUBLICATIONS

Written Opinion in PCT/CN2018/123775 dated Sep. 26, 2019, 4 pages.
Hou, Beiping et al., Fast Human Detection Using Motion Detection and Histogram of Oriented Gradients, Journal of Computers, 6(8): 1597-1604, 2011.
The Extended European Search Report in European Application No. 18945292.3 dated Nov. 3, 2021, 8 pages.

* cited by examiner (a) (b) (c)

SYSTEMS AND METHODS FOR OBJECT RECOGNITION

CROSS-REFERENCE TO RELATED APPLICATIONS

This application is a continuation of International Patent Application No. PCT/CN2018/123775, filed on Dec. 26, 2018, the contents of which are hereby incorporated by reference.

TECHNICAL FIELD

The present disclosure generally relates to image processing, and in particular, to systems and methods for recognizing an object in an image.

BACKGROUND

Object recognition plays an important role in the field of image processing. Various techniques have been developed for recognizing an object in an image and found its wide application in, for example, machine vision, aerospace remote sensing measurement, medical image analysis, robot navigation and positioning, or the like. In some embodiments, the objection recognition result may be greatly affected by, for example, the noise included in the image, the geometric transformation of the object in the image, the brightness condition in the image, etc. It is desirable to provide a system and method to improve the accuracy of objection recognition in the image.

SUMMARY

An aspect of the present disclosure introduces a system for object recognition. The system may include at least one storage medium including a set of instructions and at least one processor in communication with the at least one storage medium. When executing the set of instructions, the at least one processor is directed to cause the system to perform the following operations. The at least one processor may be directed to cause the system to obtain an image including a search region and obtain a model including a plurality of feature points. The at least one processor may be directed to cause the system to determine, for each of one or more sub-regions of the search region, a match metric indicating a similarity between the model and the sub-region of the search region, and the match metric may at least correlate with the amount of feature points that satisfy a condition. The at least one processor may also be directed to cause the system to determine, among the one or more sub-regions of the search region, an instance of the model based on the match metrics.

In some embodiments, to obtain a model including a plurality of feature points, the at least one processor may be directed to cause the system to: acquire a template image of an object; extract one or more edge points of the object in the template image; and generate the model based on designating the one or more edge points as at least part of the plurality of feature points.

In some embodiments, to extract one or more edge points of the object in the template image, the at least one processor may be directed to cause the system to: determine, for each point in the template image, a first gradient of the point along a first direction and a second gradient of the point along a second direction distinct from the first direction; determine a weighted gradient of the point based on the first gradient of the point and the second gradient of the point; and extract points whose weighted gradients are above a threshold as the one or more edge points of the object in the template image.

In some embodiments, the weighted gradient of the point may be based on a first weighting coefficient associated with the first gradient and a second weighting coefficient associated with the second gradient.

In some embodiments, the first weighting coefficient or the second weighting coefficient may be determined according to a category of the object.

In some embodiments, to determine, for each of one or more sub-regions of the search region, a match metric indicating a similarity between the model and the sub-region of the search region, the at least one processor may be directed to cause the system to: determine, for each of the plurality of feature points, a similarity value between the feature point and a point in the sub-region; designate the feature point as a similar point as the point in the sub-region in response to a determination that its similarity value is above a second threshold; and designate the amount of the similar points as a representation of the match metric.

In some embodiments, the similarity value between a feature point and a point in the sub-region may be represented by a cosine distance between the feature point and the point in the sub-region.

In some embodiments, to determine, among the one or more sub-regions of the search region, an instance of the model based on the match metrics, the at least one processor may be directed to cause the system to: designate, among the one or more sub-regions of the search region, a target sub-region whose match metric is maximum; and determine the instance of the model within the target sub-region.

In some embodiments, to obtain an image including a search region, the at least one processor may be directed to cause the system to: acquire a down-sampled image of the image; determine a region of the down-sampled image that corresponds to the instance of the model; and map the region of the down-sampled image to the image to generate the search region of the image.

In some embodiments, to obtain a model including a plurality of feature points, the at least one processor may be directed to cause the system to: retrieve information related to the model including position information of the plurality of feature points, gradient information of the plurality of feature points, and the amount of the plurality of feature points.

According to another aspect of the present disclosure, a method implemented on a computing device including at least one processor and at least one storage medium may include: obtaining an image including a search region; obtaining a model including a plurality of feature points; determining, for each of one or more sub-regions of the search region, a match metric indicating a similarity between the model and the sub-region of the search region, the match metric at least correlating with the amount of feature points that satisfy a condition; and determining, among the one or more sub-regions of the search region, an instance of the model based on the match metrics.

According to still another aspect of the present disclosure, a system for object recognition may include: an image acquisition module configured to obtain images; a model acquisition module configured to acquire a model and/or information of an image; a similarity determination module configured to determine a similarity between an image of an object and a target image; and an instance determination module configured to determine an instance of the model of the object.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
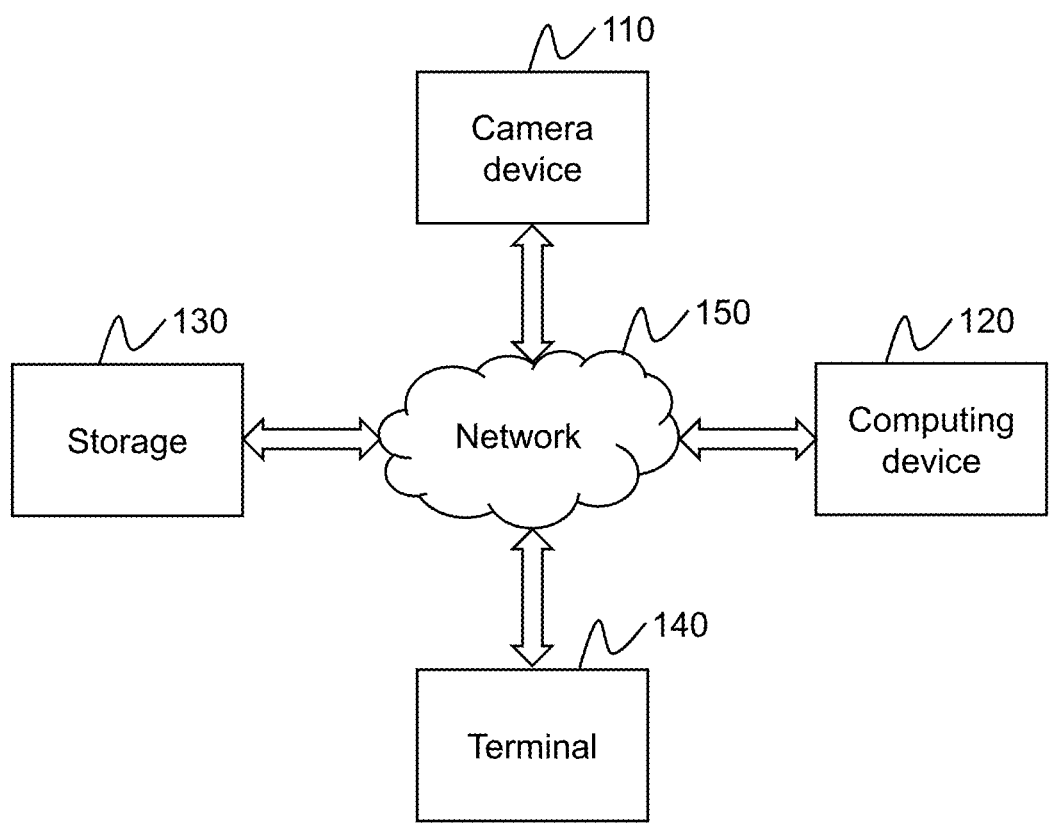
FIG. 1 is a schematic diagram illustrating an exemplary image processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to methods and systems for object recognition in an image. To recognize an object in the image, the system may use a model of the object to compare with different sub-regions of the image. The comparison results may be represented by a match metric that indicates a similarity between the model of the object and each of the different sub-regions of the image. The system may further determine an instance of the object in the image based on the match metrics. In some embodiments, the model of the object may be a cluster of feature points extracted from, for example, a template image of the object. The match metric between the model of the object and each of the different sub-regions of the image may at least correlate with the amount of feature points that satisfy a certain condition.

FIG. 1 is a schematic diagram illustrating an exemplary image processing system 100 according to some embodiments of the present disclosure. In some embodiments, the image processing system 100 may be used in an intelligent transportation system (ITS), a security system, a transportation management system, a prison system, an astronomical observation system, a monitoring system, a species identification system, an industry controlling system, an identity identification (ID) system, a medical imaging system, a retrieval system, or the like, or any combination thereof. The intelligent transportation system (ITS) may be an imaging system for monitoring a traffic violation. The traffic violation may include a red traffic light violation, an overload violation, a speeding violation, an illegal parking, a stop sign violation, a failure to use a seat belt, a failure to stop for a school bus, a driving in a car pool lane illegally, a vehicular homicide, or the like, or any combination thereof. The retrieval system may be an object retrieval system for recognizing a target object within an image. The target object may be any specific object, such as a human face, an animal, a specific device, an instance of a model, or the like, or a combination thereof. Alternatively, the retrieval system may be an image retrieval system for searching an image of interest from an image database. The image of interest may include a target object defined or designated by a user.

In some embodiments, the image processing system 100 may include a 2D camera system, a 3D camera system, a panoramic camera system, a virtual reality (VR) camera system, a web camera system, an instant picture camera system, an electronic eye system, a camcorder system, a thermal imaging system, a visible imaging system, an ultrasonic imaging system, a radiological scanning imaging system, or the like, or any combination thereof.

As illustrated in FIG. 1, the image processing system 100 may include a camera device 110, a computing device 120, a storage 130, a terminal 140, and a network 150. In some embodiments, the camera device 110 and the computing device 120 may be integrated as a single device. Alternatively, the camera device 110 may be installed at a remote location from the computing device 120.

The camera device 110 may be configured to capture an image or a video. In some embodiments, the camera device 110 may include a stereo camera configured to capture a still image or a video. The stereo camera may include a binocular vision device or a multi-camera. In some embodiments, the camera device 110 may include a digital camera. The digital camera may include a 2D camera, a 3D camera, a panoramic camera, a VR (virtual reality) camera, a web camera, an instant picture camera, or the like, or any combination thereof. The digital camera may be added to or be part of a medical imaging equipment, a night vision equipment, a radar system, a sonar system, an electronic eye, a camcorder, a thermal imaging device, a smartphone, a tablet PC, a laptop, a wearable device (e.g., 3D glasses), an eye of a robot, or the like, or any combination thereof. The digital camera may also include an optical sensor, a radio detector, an artificial retina, a mirror, a telescopes, a microscope, or the like, or any combination thereof.

In some embodiments, the camera device 110 may capture one or more images of an object. The object may include a vehicle, a passenger, a traffic light, a traffic sign, a road sign, or the like, or any combination thereof. In some embodiments, the camera device 110 may capture images corresponding to the same (or substantially the same) field of view (FOV) or different FOVs. The size of the FOV(s) may be adjusted according to the position of a camera, the orientation of a camera, the time of capturing, or the like, or a combination thereof.

In some embodiments, the camera device 110 may transmit the captured video and/or image to the computing device 120, the storage 130 and/or the terminal 140 via the network 150.

The computing device 120 may be configured to process data and/or generate a control signal for the image processing system 100. The data may include image data or video data. The data may be analog or digital. In some embodiments, the computing device 120 may generate a control signal including, for example, a control signal for the camera device 110 to capture an image, a control signal to recognize an object within an image, a control signal to match a model with an image, a control signal to store/delete data, a control signal to transmit data among components of the image processing system 100, or the like, or any combination thereof. In some embodiments, the control signal may be generated based on the data received from the camera device 110, the storage 130, the terminal 140, or based on instructions from a user, or instructions stored in the storage 130.

In some embodiments, the computing device 120 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the computing device 120 may include a microprocessor to process an image captured by the camera device 110.

In some embodiments, the processing operations may include analyzing and/or processing an image to generate a processed image (e.g., a smoothed image). For example, in order to better recognize an object in an image with poor quality, the computing device 120 may preprocess the image to, for example, improve the quality of the image.

In some embodiments, the computing device 120 may recognize an object in an image according to a model of the object or another image which may also have a same or similar object (e.g., a template image). For example, the computing device 120 may recognize a switch with an "on" state in an image according to a model of a switch with an "on" state. Similarly, the computing device 120 may recognize a switch with an "off" state in an image according to a template image of a switch with an "off" state.

In some embodiments, the computing device 120 may acquire data from the camera device 110, the storage 130, and/or the terminal 140 via the network 150. In some embodiments, data and/or image(s) processed by the computing device 120 may be stored in the storage 130. Additionally, a training model, an algorithm, or the like, may be stored in the storage 130. In some embodiments, the computing device 120 and the storage 130 may be integrated into a single device to store and process data.

The storage 130 may be configured to store data from the camera device 110, the computing device 120, the terminal 140, and/or other component(s) of the image processing system 100. In some embodiments, the storage 130 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 130 may be configured to store one or more programs and/or instructions that may be executed by the processor(s) of the image processing system 100 to perform exemplary methods described in the this disclosure. For example, the storage 130 may be configured to store program(s) and/or instruction(s) executed by the processor(s) of image processing system 100 to capture image(s) or video(s), process image data or video data, or display any intermediate result. For example, a ROM in the storage 130 may store an algorithm to recognize a user-defined model of an object in an image.

The terminal 140 may be configured to receive information from and/or send information to the camera device 110, the computing device 120, or the storage 130 via the network 150. For example, the terminal 140 may receive a user instruction from its I/O interface and send the user instruction to the computing device 120 to initiate one or more operations. Specifically, the user instruction may indicate a user-defined model of an object that is to be recognized in one or more images. In some embodiments, the information displayed on the terminal 140 may include an image, a video, a user interface, a value, a text, control information, a program, software, an algorithm, or the like, or any combination thereof. In some embodiments, the image displayed on the terminal 140 may include an original image, a reconstructed image, a processed image, or the like, or any combination thereof. In some embodiments, the terminal 140 may include a smart phone, a personal computer, a tablet, a laptop, a wearable device (e.g., a smart watch, a pair of smart glasses, or the like), or the like, or a combination thereof. In some embodiments, the terminal 140 and the computing device 120 may be integrated in one device to perform exemplary functions of the terminal 140 and the computing device 120 disclosed in this disclosure.

The network 150 may be configured to facilitate communications among the components of the image processing system 100 (e.g., the camera device 110, the computing device 120, the storage 130, and the terminal 140). For example, the network 150 may transmit data from the camera device 110 to the computing device 120. As another example, the network 150 may transmit data processed and/or generated by the computing device 120 to the terminal 140.

In some embodiments, the network 150 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. In some embodiments, the camera device 110, the computing device 120, the storage 130, the terminal 140, or the network 150 may be connected to or communicate with each other directly or indirectly.

In some embodiments, two or more components of the camera device 110, the computing device 120, the storage 130 and the terminal 140 may be integrated with each other. For example, the computing device 120 and the terminal 140 may be integrated as a one device. As another example, the camera device 110 and the computing device 120 may be integrated as a one device. In some embodiments, one or more of the above components may be located remote from each other. Merely by way of example, the computing device 120 may be implemented on a cloud platform (e.g., a cloud computing platform or cloud storing platform). As another example, the terminal 140 may be controlled by a remote system (e.g., a remote medical system or a remote security system).

It should be understood that, the component(s) of the image processing system 100 illustrated in FIG. 1 may be implemented via various ways. For example, the components may be implemented through hardware, software, or a combination thereof. Herein, the hardware may be implemented by a dedicated logic, the software may be stored in the storage and executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
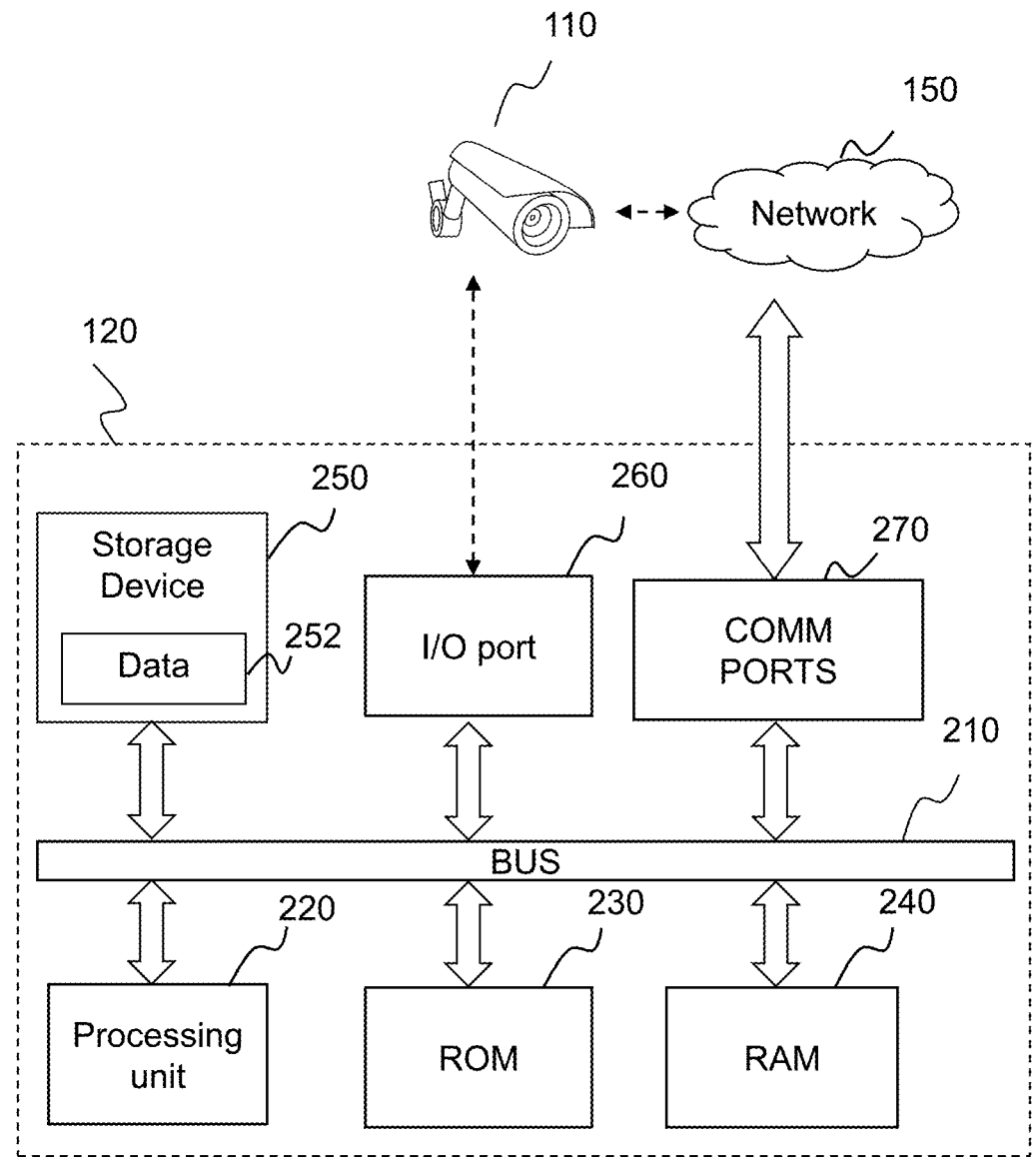
FIG. 2 illustrates a schematic diagram of an exemplary hardware and/or software components of an exemplary computing device according to some embodiments of the present disclosure.

FIG. 2 illustrates a schematic diagram of an exemplary hardware and/or software components of an exemplary computing device according to some embodiments of the present disclosure. The computing device 120 may be configured to implement a device/component/module/unit of the image processing system 100. The computing device 120 may include a bus 210, a processing unit (CPU or processor) 220, a read-only memory (ROM) 230, a random-access memory (RAM) 240, a storage device 250, an input/output (I/O) port 260, and a communication port 270.

The bus 210 may connect various components of the computing device 120 and transfer data among them. The bus 210 may be any of several types of bus structures including a memory bus, a peripheral bus, and a local bus using any of a variety of bus architectures.

The I/O port 260 may transfer data between the bus 210 and an external device, for example, an imaging device 110, etc. The I/O port 260 may include a USB port, a COM port, a PS/2 port, an HDMI port, a VGA port, or the like, or any combination thereof. The Communication port 270 may transfer data between the bus 210 and an external device, for example, the network 150, the imaging device 110, etc. The communication port 270 may be a network interface card (NIC).

The processing unit 220 may include multiple cores or processors, caches, etc. A multicore processor may be symmetric or asymmetric. The ROM 230, the RAM 240, and the storage device 250 may be configured to store data, e.g., data 252. The ROM 230 may store a basic input/output (BIOS) which may provide the basic routine that helps to transfer information between devices/components within the computing device 120, such as during initializing of a computer operating system. The storage device 250 may provide nonvolatile storage for the data 252. The storage device 250 may connect to the bus 210 through a drive interface. The storage device 250 may include a hard disk, a solid state disk (SSD), a flash memory card, a magnetic disk drive, an optical disk drive, tape drive, or the like, or any combination thereof. The data 252 may be transferred through the bus 210 to the RAM 240 before being processed by the processing unit 220.

The data 252 may include data or code implementing computer readable instructions, data structures, images, information, temporary data, and others. Computer readable instruction may be executed by the processing unit 220 to perform various functions, such as the functions of the computing device 120, functions of the imaging device 110, functions of the terminal 140, functions of the network 150, functions of generating and/or operating a data structure, e.g., a neural network, or any other function. A group of related computer readable instructions may be packaged as software. Temporary data may be data generated by the processing unit 220 while performing any computer readable instructions.

Figure 3:
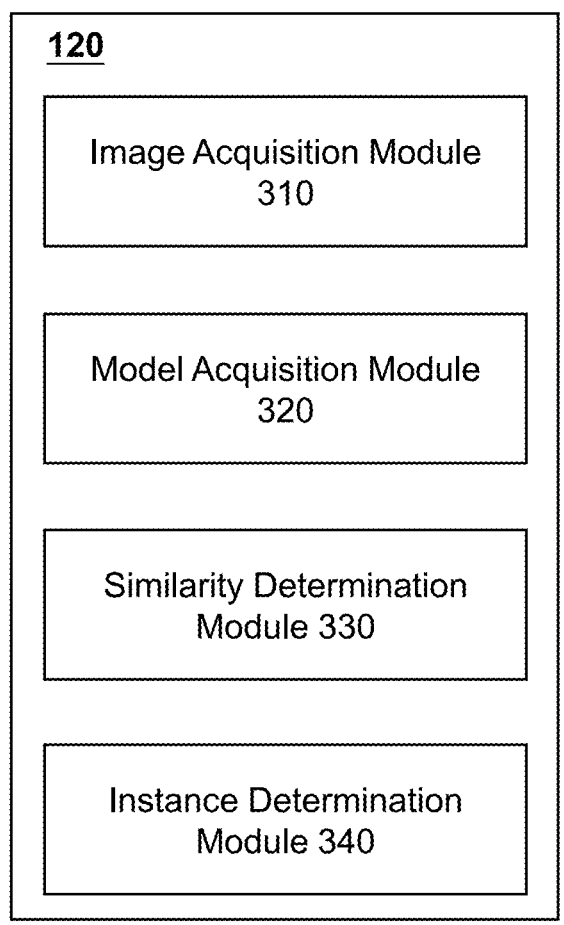
FIG. 3 is a block diagram illustrating an exemplary computing device according to some embodiments of the present disclosure.

FIG. 3 is a block diagram illustrating an exemplary computing device 120 according to some embodiments of the present disclosure. The computing device 120 may include an image acquisition module 310, a model acquisition module 320, a similarity determination module 330, and an instance determination module 340.

The image acquisition module 310 may be configured to obtain images. The images may include an image of interest, an image of an object and/or a target image, or the like. For example, the image acquisition module 310 may obtain an image in which one or more objects are to be recognized. The image acquisition module 310 may obtain the images and information relating to the images received from the camera device 110, the terminal 140 and/or the storage 130 via the network 150. In some embodiments, the image acquisition module 310 may send a template image to the model acquisition module 320 to generate a model.

The model acquisition module 320 may be configured to acquire a model. The model acquisition module 320 may acquire a model of an object from, for example, the storage 320. The model of the object may be generated by a training model and used as a template to recognize an instance of the object in another image. In some embodiments, the model acquisition module 320 may extract information of an object in an image to generate the model of the object. The information may include color information, gray value information, edge information, lines, corners, points, or the like.

The similarity determination module 330 may be configured to determine a similarity between an image of an object and a target image. For example, the similarity determination module 330 may determine a match metric indicating a similarity between the model of the object and one or more sub-regions of a search region in the target image.

The instance determination module 340 may be configured to determine an instance of a model of an object. For example, the instance determination module 340 may identify an instance of the object (or an instance of the model of the object) in one of the sub-regions of a search region in an image.

The modules in the computing device 120 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units.

Figure 4:
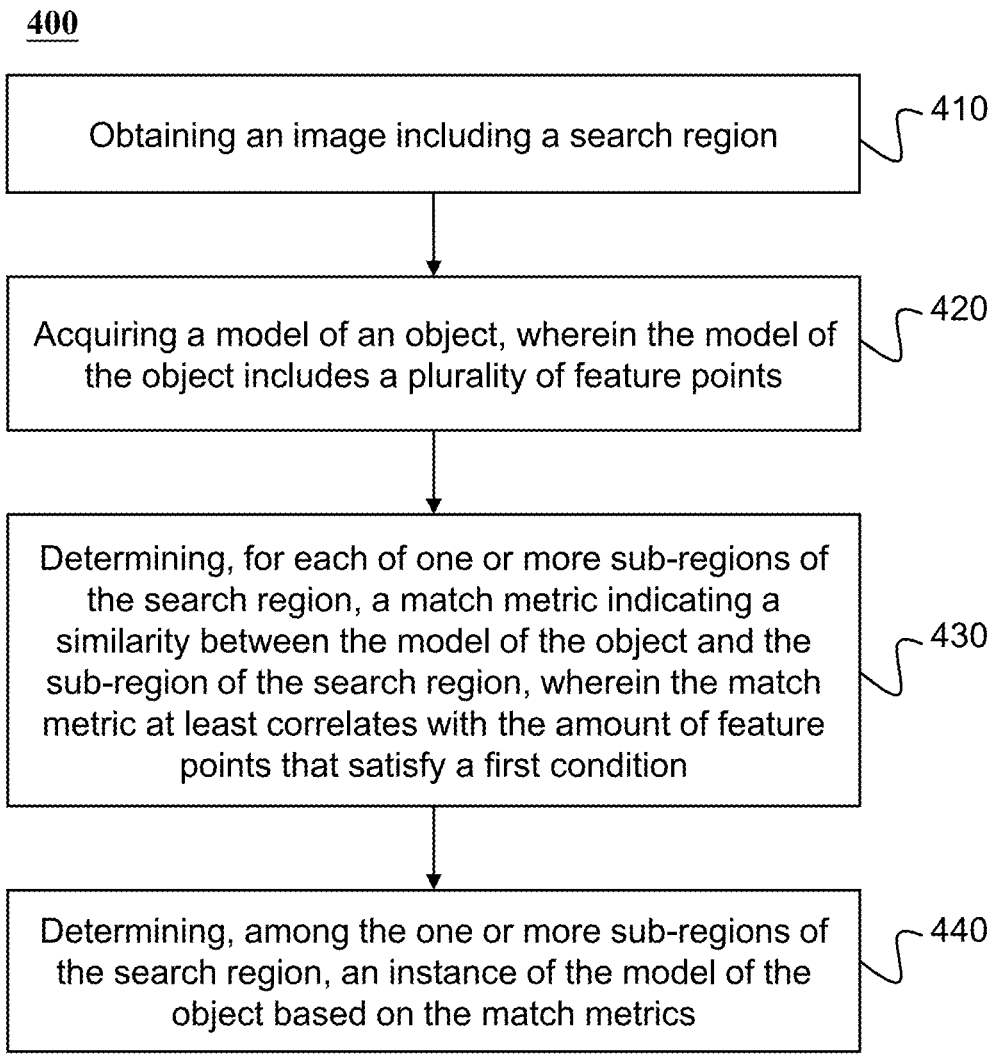
FIG. 4 is a flowchart illustrating an exemplary process of object recognition according to some embodiments of the present disclosure.

FIG. 4 is a flowchart illustrating an exemplary process 400 of object recognition according to some embodiments of the present disclosure. The process 400 may be executed by the image processing system 100. For example, the process 400 may be implemented as a set of instructions (e.g., an application) stored in the storage 130 in the image processing system 100. The computing device 120 may execute the set of instructions and may accordingly be directed to perform the process 400 in the image processing system 100. The operations of the illustrated process 400 presented below are intended to be illustrative. In some embodiments, the process 400 may be accomplished with one or more additional operations not described, and/or without one or more of the operations discussed. Additionally, the order in which the operations of the process 400 is performed as illustrated in FIG. 4 and described below is not intended to be limiting.

In 410, the computing device 120 (e.g., the image acquisition module 310) may obtain an image. The image may be obtained from a storage device (e.g., the storage 130), the camera device 110, or the terminal 140. The image may be an image of interest, in which a target object may be recognized. For example, in an application of face detection, the image may include a user-defined face to be recognized.

The image may include a search region. The search region may refer to a region in which an operation to recognize the target object is performed. The search region may cover the whole image or part of the image. For example, assuming that an image has the size of 256*256 pixels, a search region of the image may have the size of 128*128 pixels.

In some embodiments, the search region may be delimited according to a user instruction from the terminal 140. For example, the user may designate the whole image or delineate an area within the whole image as the search region via an I/O of the terminal 140. Additionally or alternatively, the search region may be determined according to one or more algorithms. For example, the computing device 120 may extract a preliminary outline of the target object to be recognized, and designate a region covering the preliminary outline of the target object as the search region. As another example, the search region may be determined based on one or more points in the image. Specifically, after a specific point is identified in the image, a region covering the specific point with a predetermined shape or size may be designated as the search region of the image. More detailed descriptions of the determination of the search region in an image may be found elsewhere in the present disclosure (e.g., in FIG. 6, and the descriptions thereof).

In 420, the computing device 120 (e.g., the model acquisition module 320) may acquire a model of an object. The model of the object may be used as a template to recognize the target object (e.g., an instance of the model of the object) in the image. For example, in a face detection scenario, a model of a face may be used to detect the face in an image. As another example, in a traffic monitoring scenario, a model of a traffic light may be used to detect the traffic lights in a monitoring image. As another example, in a medical imaging scenario, a model of a tumor may be used to detect a tumor region in a medical image.

The model of the object may be in various forms, such as, an image, a cluster of points, a combination of lines, etc. In some embodiments, the model of the object may be generated according to an image of the object. For example, the model acquisition module 320 may extract the color information, the gray value information, the edge information, the lines, the corners, or the like, in the image of the object to generate the model of the object. In some embodiments, the model of the object may be generated by a training model. Exemplary training model may include a part-base model, a Gaussian model, a Hidden Markov model (HMM), or the like, or any combination thereof.

Merely for illustration purpose, the model of the object may be formed by a plurality of feature points associated with the object. The plurality of feature points of the object may be extracted from the image of the object according to various point extraction algorithms. For example, one or more feature points may be extracted from an edge of the object according to the gradients of the points in the image of the object. As another example, one or more feature points may be extracted from a corner of the object according to a derivative of a curvature. As a further example, one or more feature points may be extracted from an edge-like part of the object where a sudden change occurs in the color intensity or brightness of the image of the object. Additionally or alternatively, the model of the object may include one or more lines (e.g., a contour line of the object) generated by linking the feature points together.

In some embodiments, information related to the model of the object may be stored in the storage 130. Exemplary information related to the model of the object may include the position information of each feature point, the gradient information of each feature point, the amount of the plurality of feature points, the gray value information of each feature point, the color information of each feature point, etc. The position information of each feature point may include the coordinate of each feature point, the position of each feature point with respect to the center of gravity of the model of the object, or a vector related to each feature point. The gradient information of each feature point may include the gradients of each feature point in different directions (e.g., the gradient in x direction, the gradient in y direction). When acquiring the model of the object, the model acquisition module 320 may retrieve the information related to the model of the object from the storage 130.

Figure 5:
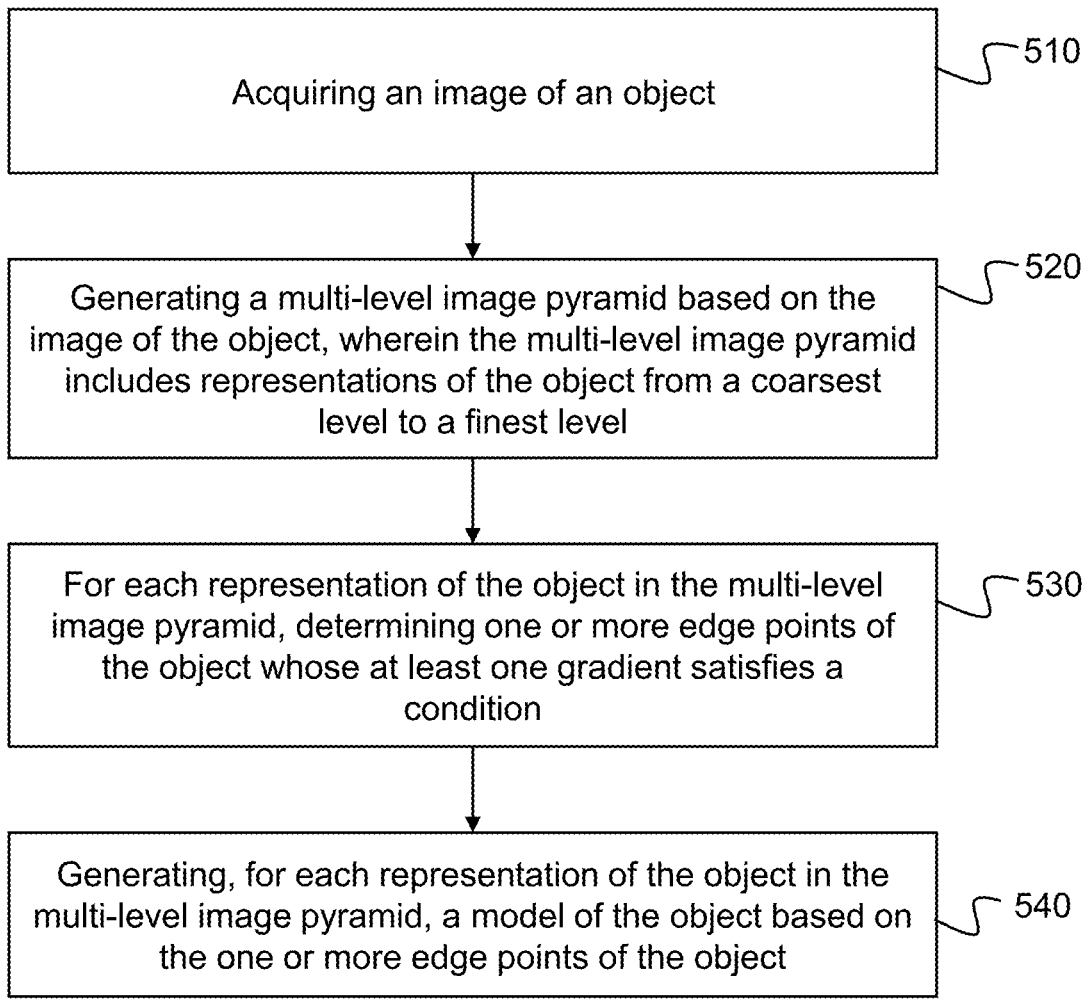
FIG. 5 is a flowchart illustrating an exemplary process of generating a model of an object according to some embodiments of the present disclosure.

In some embodiments, the model of the object may correspond to one representation of the object in a multi-level image pyramid as described elsewhere in the present disclosure (e.g., the operation 540 in FIG. 5).

In 430, the computing device 120 (e.g., the similarity determination module 330) may determine, for each of one or more sub-regions of the search region, a match metric indicating a similarity between the model of the object and the sub-region. Each of the one or more sub-regions may correspond to a portion of the search region. Different sub-regions (e.g., two adjacent sub-regions) may have an overlap or no overlap with each other.

In some embodiments, the one or more sub-regions may be formed according to a sliding window. For example, the sliding window may slide within the search region with a step length, and the region included in the sliding window generated by each movement of the sliding window may be designated as a sub-region of the search region. For example, if the sliding window moves 10 times, by the step length each time, from the left-most side of the search region to the right-most side of the search region, 10 sub-regions of the search region may be generated. The sliding window may have various shapes, such as a rectangle, a circle, an ellipse, a polygon, an irregular shape, etc. Specifically, if the sliding window is rectangular, each of the one or more sub-regions may have the shape of a rectangle corresponding to the rectangular sliding window.

In some embodiments, the sliding window may have a size no less than that of the model of the object. For example, the model of the object can be completely projected into the sliding window. More details of the determination of the one or more sub-regions may be found elsewhere in the present disclosure (e.g., in FIG. 6 and the description thereof).

Each of the one or more sub-regions of the search region may include a plurality of points. In some embodiments, the plurality of points in each of the one or more sub-regions of the search region may be compared with the plurality of feature points of the model of the object to generate the match metric, respectively.

The match metric may indicate the similarity between the model of the object and each of the one or more sub-regions of the search region. In some embodiments, the match metric may correlate with the feature points that satisfy a first condition. The first condition may be used to sort out the feature points which may have a relatively high similarity with the points of a sub-region. The first condition may relate to the gradient information of a feature point, the gray value information of a feature point, the color information of a feature point, the pixel information of a feature point, the cosine distance between a feature point and a corresponding point in a sub-region, or the like, or any combination thereof. For example, the first condition may include that a cosine distance between a feature point and a corresponding point in a sub-region is less than a threshold, and the match metric may be represented by the amount of the feature points that satisfy the first condition. As another example, the first condition may include that a squared gray value differences or a gray value difference between a feature point and a corresponding point in a sub-region is less than a threshold, and correspondingly, the match metric may be represented by a sum of the squared gray value differences or a sum of the absolute value of the gray value differences.

In 440, the computing device 120 (e.g., the instance determination module 340) may determine, among the one or more sub-regions of the search regions, an instance of the model of the object based on the match metrics.

In some embodiments, the instance of the model of the object may be determined based on the match metric that satisfies a second condition. For example, in the case when the match metric is represented by the amount of the feature points, the instance of the model may be deemed to be within the sub-region whose amount of feature points that satisfy the first condition is the maximum. As another example, in the case when the match metric is represented by a sum of the squared gray value differences or a sum of the absolute value of the gray value differences, the instance of the model of the object may be deemed to be within the sub-region whose sum of the squared gray value differences or sum of the absolute value of the gray value differences is less than a threshold, or is the minimum.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 5 is a flowchart illustrating an exemplary process 500 of generating a model of an object according to some embodiments of the present disclosure. The process 500 may be executed by the image processing system 100. For example, the process 500 may be implemented as a set of instructions (e.g., an application) stored in a storage device in computing device 120. The computing device 120 may execute the set of instructions and may accordingly be directed to perform the process 500 in the image processing system 100. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, the operation 420 may be achieved according to the process 500 or at least part thereof.

In 510, the computing device 120 (e.g., the image acquisition module 320) may acquire an image of an object. The image of the object may be acquired from the camera device 110, the storage 130, or the terminal 140. In some embodiments, the image of the object may be referred to as a template image, and the object in the image or a representation thereof may be further regarded as a template for object recognition in subsequent processes.

In 520, the computing device 120 (e.g., the model acquisition module 320) may generate a multi-level image pyramid based on the image of the object. Exemplary multi-level image pyramids may include a Gaussian pyramid, a Laplacian pyramid, a Steerable pyramid, or any other suitable image pyramid.

The multi-level image pyramid may include a plurality of level images corresponding to a plurality of representations of the object. For example, the plurality of level images may correspond to the representations of the object in multiple levels, e.g., from the coarsest level to the finest level, respectively. The representation of the object in a lower level image (e.g., a relatively coarse level representation of the object) may include less information than the representation of the object in a higher level image (e.g., a relatively fine level representation of the object). Specifically, the pixel number in the higher level image may be more than that in the lower level image, and the resolution of the higher level image may be better than the lower level image. In some embodiments, the model of the object described in the operation 420 may be derived from any level image in the multi-level image pyramid.

In some embodiments, the image of the object acquired in the operation 510 may be designated as the highest level image corresponding to the finest level representation of the object. The highest level image may be down-sampled to generate the second highest level image and so on. After a plurality of down-sampling operations, the multi-level image pyramid may be generated. In some embodiments, the down-sampling operation may include reducing the size and resolution of a higher level image. For example, a higher level image may have double the size and resolution of its next lower level image. To generate the lower level image, the pixels in a block (e.g., a 2×2 block) of the higher level image may be replaced by a single pixel, and the values of the pixels in the block may be averaged to generate the value of the single pixel. Alternatively, the down-sampling operation may be achieved or replaced by a mean filter with the appropriate mask size. The mean filter may include an arithmetic mean filter, a geometric mean filter, a harmonic mean filter, a contra-harmonic mean filter, or the like, or any combination thereof. For example, a 3×3 mean filter may be used to replace each pixel value in an image with a mean value of its neighboring pixels.

In some embodiments, the number of the level images of the multi-level image pyramid may be predetermined. For example, the number of the level images is prescribed such that the resolution of the lowest level image may be no smaller than a threshold value (e.g., 64*64 pixels). As another example, the number of the level images may be predetermined via a user input or by the computing device 120 dynamically. Specifically, the computing device 120 may dynamically adjust the number of the level images of the multi-level image according to the available computing resource.

In 530, the computing device 120 (e.g., the model acquisition module 320) may determine, for each representation of the object in the multi-level image pyramid, one or more edge points of the object. As used herein, an edge point may be regarded as a feature point as described elsewhere in the present disclosure. In some embodiments, the one or more edge points for each representation of the object may be obtained by an edge filter. Exemplary edge filters may include a Canny edge filter, a Sobel edge filter, or the like, or a combination thereof.

In some embodiments, the one or more edge points for a certain representation of the object may be the points (e.g., pixels) in the corresponding level image whose at least one gradient satisfies a third condition. The at least one gradient of a point may include one or more gradients of the point along one or more directions. The one or more directions may be any two directions distinct from each other, such as two directions orthogonal to each other.

For brevity, taking a two-dimensional image as an example, the at least one gradient of a pixel may be the gradient of the pixel along the x direction (i.e., the horizontal direction) or the y direction (i.e., the vertical direction). The gradient of the pixel along the x direction may be reflected by the pixel value difference between the pixel and one or more of its neighboring pixels along the x direction, or merely the pixel value difference between two or more of its neighboring pixels along the x direction. Similarly, the gradient of the pixel along the y direction may be reflected by the pixel value difference between the pixel and one or more of its neighboring pixels along the y direction, or merely the pixel value difference between two or more of its neighboring pixels along the y direction. That the at least one gradient of the point satisfies a third condition may include that the gradient of the point along one direction (e.g., x direction or y direction) is above a threshold value, or include that a (weighted) sum of the gradients of the point along the two directions is above another threshold value.

For better illustration, an exemplary third condition for determining an edge point is described in equation (1). The exemplary third condition may be that a weighted sum of the gradients of a point along two directions (x direction and y direction) are above a threshold value.

$$\alpha \times G_x \beta \times G_y > t \quad (1)$$

where, $G_x$ and $G_y$ refer to the gradients in x direction and y direction, respectively, $\alpha$ and $\beta$ refer to weighting coefficients of the gradients in x direction and y direction, respectively, and t refers to a threshold value. In some embodiments, the threshold value t may be a preset value, or a value that can be dynamically adjusted by the computing device 120 according to different conditions.

In some embodiments, to provide better accuracy in determining the edge points of the object, the weighting coefficients $\alpha$ and $\beta$ may be set differently according to different conditions. For example, in the case that the size of the object along x direction is greater than the size of the object along y direction, the weighting coefficient $\alpha$ may be assigned with a larger value than the weighting coefficient $\beta$. In the case that the size of the object along x direction is smaller than the size of the object along y direction, the weighting coefficient $\alpha$ may be assigned with a smaller value than the weighting coefficient $\beta$. In the case that the size of the object along x direction is equal to the size of the object along y direction, the weighting coefficient $\alpha$ may be assigned with a same value as the weighting coefficient $\beta$. In some embodiments, the setting of the weighting coefficients $\alpha$ or $\beta$ may be performed by the computing device 120 according to a category of the object. For example, before extracting the edge points of the object in an image, the computing device 120 may classify the object into a specific category based on, for example, the sizes of the object along different directions, or any descriptive information or instruction associated with the object. Then, the computing device 120 may determine the weighting coefficients suitable for the specific category according to, for example, a preset rule. It shall be noted that the process for determining the edge point(s) according to equation (1) is mainly based on the geometric feature of the object, which is less susceptible to the variation of the appearance of the object in the image caused by, for example, out of focus, brightness variance, size variance, etc.

In 540, the computing device 120 (e.g., the model acquisition module 320) may generate, for each representation of the object in the multi-level image pyramid, a model based on the one or more edge points of the object. In some embodiments, the computing device 120 may gather the information of the one or more edge points of the object for each representation of the object and store it in the storage 130. The information may include the position of the edge points with respect to the center of gravity of the object, the gradient information of the edge points, the amount of the edge points, the gray value information of the edge points, the color information of the edge points, or the like, or any combination thereof.

In some embodiments, the computing device 120 may retrieve the information of the one or more edge points from the storage 130, and if needed, arrange the one or more edge points according to the information thereof to generate the model of the object.

It should be noted that the above description is merely provided for the purposes of illustration, and not intended to limit the scope of the present disclosure. For persons having ordinary skills in the art, multiple variations and modifications may be made under the teachings of the present disclosure. For example, the multi-level image pyramid may be generated by up-sampling a coarsest level image to generate a second coarsest level image and so on. However, those variations and modifications do not depart from the scope of the present disclosure.

Figure 6:
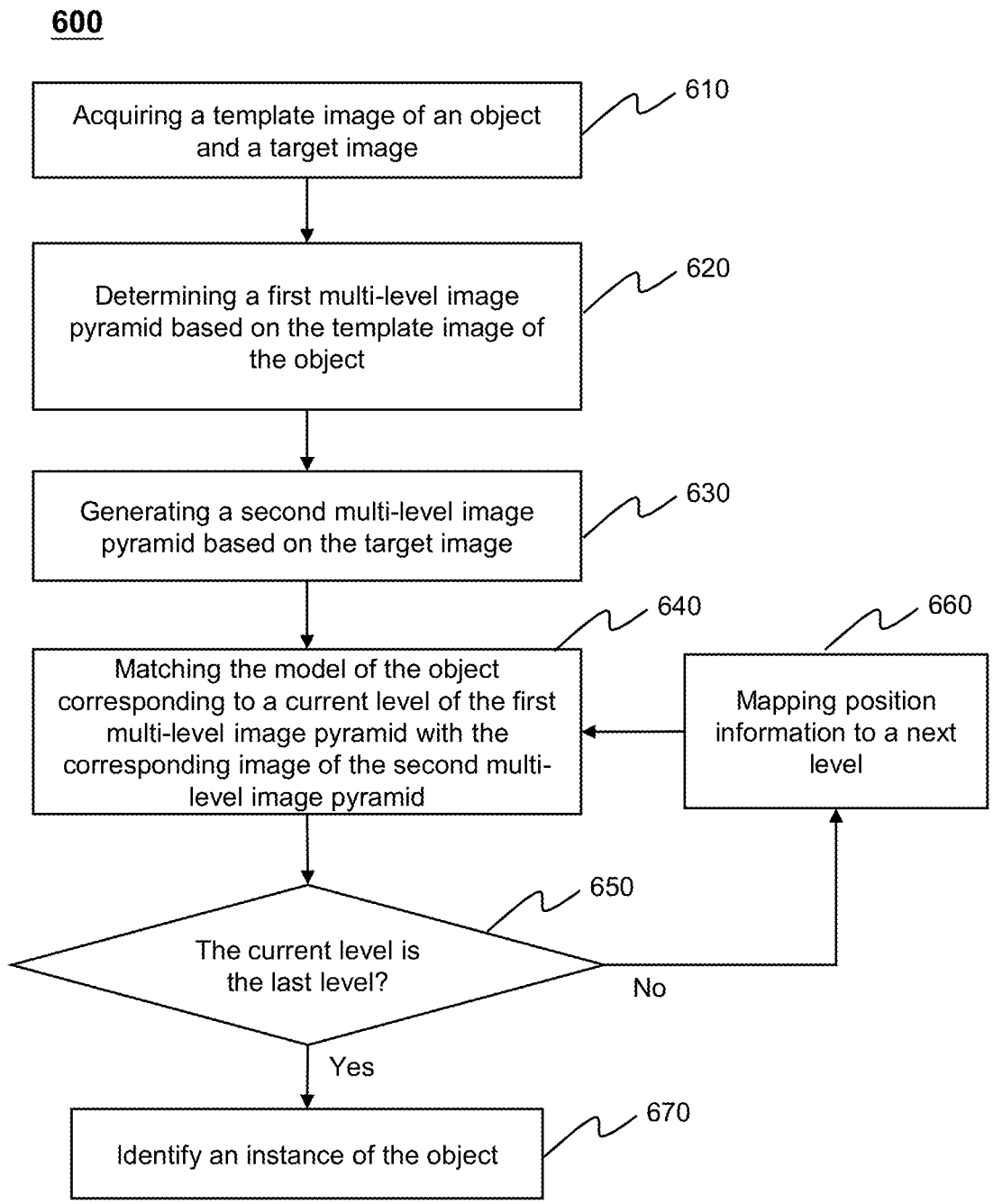
FIG. 6 is a flowchart illustrating an exemplary process of recognizing an instance of an object in an image according to some embodiments of the present disclosure.

FIG. 6 is a flowchart illustrating an exemplary process 600 of recognizing an instance of an object in an image to be recognized according to some embodiments of the present disclosure. The process 600 may be executed by the image processing system 100. For example, the process 600 may be implemented as a set of instructions (e.g., an application) stored in a storage device in the computing device 120. The computing device 120 may execute the set of instructions and accordingly be directed to perform the process 600 in the image processing system 100. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In step 610, the computing device 120 (e.g., the image acquisition module 310) may acquire a template image of an object and a target image.

The template image of the object may be used to provide a template of the object (e.g., a model of the object). The template of the object may be generated by the computing device 120 according to, for example, at least part of the process 500. In some embodiments, the template image of the object may be acquired from a storage device (e.g., the storage 130), or the terminal 140.

The target image may be an image that may include an instance of the template of the object. In some embodiments, the instance of the template of the object in the target image may be different from the object in the template image in the aspect of, for example, brightness, definition, shape, etc. In some embodiments, the target image may be captured by the camera device 110 or acquired from a storage device (e.g., the storage 130), or the terminal 140.

In 620, the computing device 120 (e.g., the model acquisition module 320) may determine a first multi-level image pyramid based on the template image of the object. Similar to the multi-level image pyramid described in the operation 520, each level of the first multi-level image pyramid may have a level image of the object that is generated from the template image of the object. The representations of the object in the plurality of level images of the object may have different levels of details ranging from the coarsest level to the finest level. Each level image of the object may be further converted to a model of the object according to, for example, a process similar to the operations 530 and 540. As such, a plurality of models of the object corresponding to different levels of representations of the object may be generated.

In 630, the computing device 120 (e.g., the model acquisition module 320) may generate a second multi-level image pyramid based on the target image. Similar to the multi-level image pyramid described in the operation 520, each level of the second multi-level image pyramid may have a level image that is generated from the target image. The plurality of level images in the second multi-level image pyramid may correspond to the same scene as presented in the target image, but with different resolutions or different sizes.

The second multi-level image pyramid and the first multi-level image pyramid may have the same number of levels. In some embodiment, both of the first multi-level image pyramid and the second multi-level image pyramid may be generated according to a plurality of down-sampling operations. For example, the template image of the object may be designated as the highest level image of the first multi-level image pyramid, and further down-sampled to generate the second highest level image and so on. The target image may be designated as the highest level image of the second multi-level image pyramid, and further down-sampled to generate the second highest level and so on.

In 640, the computing device 120 (e.g., the similarity determination module 330) may match the model of the object corresponding to a current level of the first multi-level image pyramid with the corresponding level image of the second multi-level image pyramid. As used herein, that a level image of the second multi-level image pyramid corresponds to a model of the object may denote that the level image of the second multi-level image pyramid and the image of the first multi-level image pyramid that corresponds to the model of the object are at the same level of the two multi-level image pyramids.

The current level may be any level of the first multi-level image pyramid including the coarsest level to the finest level. In some embodiments, the coarsest level may be designated as the initial current level, and the process 600 may iteratively update the current level by performing the operation 640 to 660 until the condition in the operation 650 is satisfied. At the current level, the computing device 120 may identify a sub-region within a search region of the corresponding level image that matches the model of the object. The search region may be the whole or a part of the corresponding level image. For example, if the coarsest level is the current level, the whole corresponding level image may be designated as the search region and an exhaustive search may be performed in this current level. As another example, if a higher level is the current level, a part of the corresponding image may be designated as the search region according to the match result of its prior lower level.

In some embodiments, a plurality of the sub-regions may be determined within the search region of the corresponding image according to a sliding window. To find out the sub-region that matches the model of the object, the computing device 120 may calculate a match metric that indicates the similarity between the model of the object and each of the sub-regions. In some embodiments, the match metric between the model of the object and each of the sub-regions may be measured by, for example, the number of feature points whose distances from the corresponding points in each of the sub-regions satisfy a condition.

For illustration purpose, the computing device 120 may retrieve the information of the feature points and set up a point to point relation between the feature points and the points in each of the sub-regions. Then, for a feature point and its corresponding point in a sub-region, the computing device 120 may calculate a distance between them (also referred to as "a similarity value"). If the distance is higher than a threshold, the computing device 120 may determine that the feature point is similar to its corresponding point in the sub-region. The computing device 120 may further count all the feature points that are similar to their corresponding points in the sub-region. The sub-region that has the maximum count may be regarded as the one that matches the model of the object.

For better illustrating the above matching process, a cosine distance between a feature point and its corresponding point of a sub-region may be used to indicate the similarity between them. The cosine distance may be calculated according to equation (2):

$$S = \frac{(G_{x_i}^T \times G_{x_i}^S) + (G_{y_i}^T \times G_{y_i}^S)}{\sqrt{G_{x_i}^{T2} + G_{y_i}^{T2}} \times \sqrt{G_{x_i}^{S2} + G_{y_i}^{S2}}} \quad (2)$$

where, S refers to a similarity value (cosine distance) between the feature point and its corresponding point in the sub-region, $G_{x_i}^S$ refers to the gradient of the feature point along x direction, $G_{y_i}^S$ refers to the gradient of the feature point along y direction, $G_{x_i}^T$ refers to the gradient of the corresponding point in the sub-region along x direction, $G_{y_i}^T$ refers to the gradient of the corresponding point in the sub-region along x direction. In some embodiments, all the gradient values described above may be normalized to be within the range from 0 to 1, which may reduce the influence of missing parts, brightness variance, noise, etc.

In 650, the computing device 120 (e.g., the similarity determination module 330) may determine whether the current level is the last level. In some embodiments, the last level may be the finest level of the first multi-level image pyramid. If the current level is the last level, the process 600 may proceed to operation 670. Otherwise, the process 600 may proceed to operation 660.

In 660, the computing device 120 (e.g., the similarity determination module 330) may map the position information of the matched sub-region at the current level to the next level (e.g., the finer level next to the current level). The position information of the matched sub-region may include one or more characteristic points (e.g., the center point) of the matched sub-region. After mapping, one or more mapping points corresponding to the one or more characteristic points may be determined in the next level image. The one or more mapping points in the next level image and the one or more characteristic points in the current level image may correspond to the same position in the real world. Then, a search region for the next level image may be set according to the one or more mapping points. For example, the search region for the next level image may be a rectangular box centered at the mapping point corresponding to the center point of the matched sub-region in the current level image. The size (e.g., length or width) of the rectangular box may be a fraction of the size of the next level image. The fraction may be any value ranging from 0 to 1, such as, 0.4, 0.5, 0.6, 0.8, etc.

In 670, the computing device 120 (e.g., the instance determination module 340) may identify an instance of the object (or an instance of the model of the object). The computing device 120 may locate the instance of the model of the object within the matched sub-region of the last level image (e.g., the finest level image).

It should be noted that the above description is merely provided for the purposes of illustration, and not intended to limit the scope of the present disclosure. For persons having ordinary skills in the art, multiple variations and modifications may be made under the teachings of the present disclosure. For example, the computing device 120 may directly retrieve the models of the object from a storage device (e.g., the storage 130), rather than perform the operations 610 and 620. However, those variations and modifications do not depart from the scope of the present disclosure.

Figure 7:
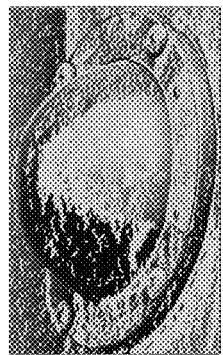
FIG. 7 is a schematic diagram illustrating an exemplary edge points extraction according to some embodiments of the present disclosure.
Figure 7:
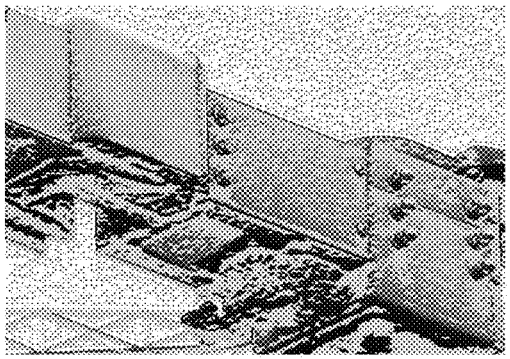
Figure 7:
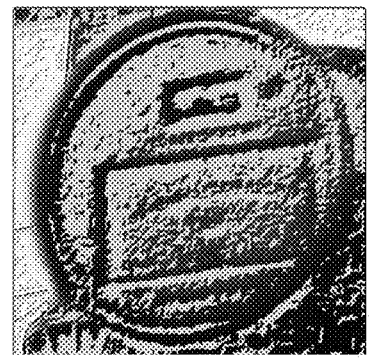

FIG. 7 is a schematic diagram illustrating an exemplary edge points extraction according to some embodiments of the present disclosure. As shown in FIG. 7, three images (a) (b) and (c) may represent different objects, respectively, and the points with relatively bright pixel values are the edge points extracted from each object according to some embodiments of the present disclosure.

The object in image (a) has a ratio of width to height less than 1, which means that the number of the edge points located along the horizontal direction are less than that along the vertical direction. When extracting the edge points in image (a) according to equation (1), the weighting coefficient of the gradient in the horizontal direction (i.e., α) was set to 0.5, and the weighting coefficient of the gradient in the vertical direction (i.e., β) was set to 1.

Similarly, the object in image (b) has a ratio of width to height greater than 1, which means that the number of the edge points located along the horizontal direction are more than that along the vertical direction. When extracting the edge points in image (b) according to equation (1), the weighting coefficient of the gradient in the horizontal direction (i.e., α) was set to 1, and the weighting coefficient of the gradient in the vertical direction (i.e., β) was set to 0.5.

Similarly, the object in image (c) has a ratio of width to height equal to 1, which means that the number of the edge points located along the horizontal direction are substantially equal to that along the vertical direction. When extracting the edge points in image (c) according to equation (1), the weighting coefficient of the gradient in the horizontal direction (i.e., α) was set to 1, and the weighting coefficient of the gradient in the vertical direction (i.e., β) was also set to 1.

Figure 8:
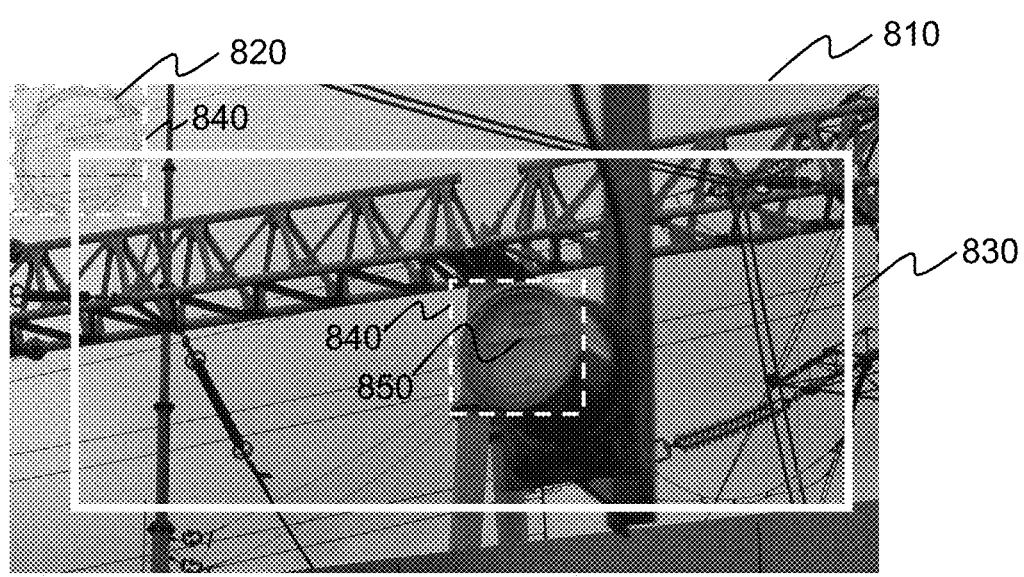
FIG. 8 is a schematic diagram illustrating an exemplary search region according to some embodiments of the present disclosure.

FIG. 8 is a schematic diagram illustrating an exemplary search region according to some embodiments of the present disclosure.

As shown in FIG. 8, the entire image 810 is designated as the search region. A model of an object 820 is located at the top left corner of the search region. The model of the object 820 is located within a sliding window 840 which is defined by a white dashed box. The sliding window 840 moves within the search region, e.g., from left to right, top to bottom, and defines a plurality of sub-regions. The model of the object 820 is compared with each sub-region to generate a plurality of match metrics as described elsewhere in the present disclosure. One of the sub-regions, the sub-region 840', is regarded to include an instance 850 of the model of the object 820 according to some embodiments of the present disclosure. Alternatively, if the image 810 is one of the level images in a multi-level image pyramid, the computing device 120 may map the center of the sub-region 840' to another level image next to the image 810 in the multi-level image pyramid. Then, a search region for the another level image (in analogy with the white rectangular box 830 with respect to the image 810) may be set within the another image according to the mapping center.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

We claim:

1. A system for object recognition, comprising:
at least one storage medium including a set of instructions; and
at least one processor in communication with the at least one storage medium, wherein when executing the set of instructions, the at least one processor is directed to cause the system to:
obtain an image including a search region;
obtain a model including a plurality of feature points;
determine, for each of one or more sub-regions of the search region, a match metric indicating a similarity between the model and the sub-region of the search region, the match metric at least correlating with the amount of feature points that satisfy a condition, wherein to determine a match metric indicating a similarity between the model and the sub-region of the search region, the at least one processor is directed to cause the system to:
for each of the plurality of feature points,
determine a similarity value between the feature point and a point in the sub-region; and
designate the feature point as a similar point as the point in the sub-region in response to a determination that its similarity value is above a threshold; and
designate the amount of the similar points as a representation of the match metric; and
determine, among the one or more sub-regions of the search region, an instance of the model based on the match metrics.

2. The system of claim 1, wherein to obtain a model including a plurality of feature points, the at least one processor is directed to cause the system to:
acquire a template image of an object;
extract one or more edge points of the object in the template image; and
generate the model based on designating the one or more edge points as at least part of the plurality of feature points.

3. The system of claim 2, wherein to extract one or more edge points of the object in the template image, the at least one processor is directed to cause the system to:
for each point in the template image,
determine a first gradient of the point along a first direction and a second gradient of the point along a second direction distinct from the first direction; and
determine a weighted gradient of the point based on the first gradient of the point and the second gradient of the point; and
extract points whose weighted gradients are above a threshold as the one or more edge points of the object in the template image.

4. The system of claim 3, wherein the weighted gradient of the point is based on a first weighting coefficient associated with the first gradient and a second weighting coefficient associated with the second gradient.

5. The system of claim 4, wherein the first weighting coefficient or the second weighting coefficient is determined according to a category of the object.

6. The system of claim 1, wherein the similarity value between a feature point and a point in the sub-region is represented by a cosine distance between the feature point and the point in the sub-region.

7. The system of claim 1, wherein to determine, among the one or more sub-regions of the search region, an instance of the model based on the match metrics, the at least one processor is directed to cause the system to:
designate, among the one or more sub-regions of the search region, a target sub-region whose match metric is maximum; and
determine the instance of the model within the target sub-region.

8. The system of claim 1, wherein to obtain an image including a search region, the at least one processor is directed to cause the system to:
acquire a down-sampled image of the image;
determine a region of the down-sampled image that corresponds to the instance of the model; and
map the region of the down-sampled image to the image to generate the search region of the image.

9. The system of claim 1, wherein to obtain a model including a plurality of feature points, the at least one processor is directed to cause the system to:
retrieve information related to the model including position information of the plurality of feature points, gradient information of the plurality of feature points, and the amount of the plurality of feature points.

10. A method for object recognition, implemented on a computing device including at least one processor and at least one storage medium, the method comprising:
obtaining an image including a search region;
obtaining a model including a plurality of feature points;
determining, for each of one or more sub-regions of the search region, a match metric indicating a similarity between the model and the sub-region of the search region, the match metric at least correlating with the amount of feature points that satisfy a condition, wherein determining a match metric indicating a similarity between the model and the sub-region of the search region comprises:
for each of the plurality of feature points,
determining a similarity value between the feature point and a point in the sub-region;
designating the feature point as a similar point as the point in the sub-region in response to a determination that its similarity value is above a threshold; and
designating the amount of the similar points as a representation of the match metric; and
determining, among the one or more sub-regions of the search region, an instance of the model based on the match metrics.

11. The method of claim 10, wherein obtaining a model including a plurality of feature points comprises:
acquiring a template image of an object;
extracting one or more edge points of the object in the template image; and
generating the model based on designating the one or more edge points as at least part of the plurality of feature points.

12. The method of claim 11, wherein extracting one or more edge points of the object in the template image comprises:
for each point in the template image,
determining a first gradient of the point along a first direction and a second gradient of the point along a second direction distinct from the first direction; and
determining a weighted gradient of the point based on the first gradient of the point and the second gradient of the point; and
extracting points whose weighted gradients are above a threshold as the one or more edge points of the object in the template image.

13. The method of claim 12, wherein the weighted gradient of the point is based on a first weighting coefficient associated with the first gradient and a second weighting coefficient associated with the second gradient.

14. The method of claim 10, wherein the similarity value between a feature point and a point in the sub-region is represented by a cosine distance between the feature point and the point in the sub-region.

15. The method of claim 10, wherein determining, among the one or more sub-regions of the search region, an instance of the model based on the match metrics comprises:
designating, among the one or more sub-regions of the search region, a target sub-region whose match metric is maximum; and
determining the instance of the model within the target sub-region.

16. The method of claim 10, wherein obtaining an image including a search region comprises:
acquiring a down-sampled image of the image;
determining a region of the down-sampled image that corresponds to the instance of the model; and
mapping the region of the down-sampled image to the image to generate the search region of the image.

17. The method of claim 10, wherein obtaining a model including a plurality of feature points, the at least one processor is directed to cause the system to:
retrieving information related to the model including position information of the plurality of feature points, gradient information of the plurality of feature points, and the amount of the plurality of feature points.

18. A non-transitory computer readable medium, comprising a set of instructions for object recognition, wherein when executed by at least one processor, the set of instructions directs the at least one processor to:
obtain an image including a search region;
obtain a model including a plurality of feature points;
determine, for each of one or more sub-regions of the search region, a match metric indicating a similarity between the model and the sub-region of the search region, the match metric at least correlating with the amount of feature points that satisfy a condition, wherein to determine a match metric indicating a similarity between the model and the sub-region of the search region, the at least one processor is directed to cause the system to:
for each of the plurality of feature points,
determine a similarity value between the feature point and a point in the sub-region;
designate the feature point as a similar point as the point in the sub-region in response to a determination that its similarity value is above a threshold; and
designate the amount of the similar points as a representation of the match metric; and
determine, among the one or more sub-regions of the search region, an instance of the model based on the match metrics.

* * * * *